Patented Mar. 4, 1941

2,234,076

UNITED STATES PATENT OFFICE 2,234,076

EMULSION POLYMERIZATION OF BUTADIENES

Walter Gumlich, Leverkusen-Schlebusch, and Ingofroh Dennstedt, Cologne-Buchforst, Rhine, Germany, assignors, by mesne assignments, to Jasco, Incorporated, a corporation of Louisiana No Drawing. Application December 17, 1938, Serial No. 246,482. In Germany December 24, 1937

2 Claims. (Cl. 260—93)

The present invention relates to improvements in the polymerization in aqueous emulsion of butadienes-1.3.

It has been found that the polymerization in aqueous emulsion of butadienes-1.3 can be considerably accelerated by working in the presence of organic water-soluble complex compounds of such heavy metals as are capable of forming different stages of oxidation. This effect is believed to be due to a catalytic action of the metal compound upon the oxygen which plays an important part in the polymerization. For giving an example there may be employed the various complex compounds of iron such as haemin, iron containing phthalocyanines which are water-soluble due to the presence of carboxyl and/or sulfonic acid groups, alkali metal salts of iron complexes of arabonic acid, pyrogallol or gallic acid. Besides iron there may be employed other metals which are within the above definition such as cobalt, nickel, copper and tin. In case of copper complexes we prefer to work in the presence of additional auxiliary agents which are capable of converting into a complex combination any traces of ionogeneous copper which might still be present as impurities; ethylene-bis-amino-diacetic acid or nitrilo-triacetic acid have proved to be suitable for the purpose in question as is more fully described in Examples 8 and 9. In general, the various phthalocyanine complex compounds have proved to be suitable as auxiliary agents for the purpose of our invention.

We are aware of the fact that heavy metals which are capable of forming different stages of oxidation have already been employed in form of their salts as polymerization accelerators. As a matter of fact most of them can be employed only in an acid medium as in an alkaline medium they are precipitated in form of their insoluble hydroxides. Our new catalysts are superior thereto in that they are equally effective in an acid or alkaline medium. However, heavy metal salts of the character described effect an increase of the sensitiveness of the polymerizates towards oxygen. Therefore, care must be taken that they are removed from the polymerizate as completely as possible. Contrary thereto, no detrimental effect is to be observed in case of traces of such complex compounds remaining within the polymerizates.

As a matter of fact our invention can be employed in case of the various butadienes-1.3 and also in case of the preparation of mixed polymerizates from butadienes-1.3 and other polymerizable compounds. Examples for suitable butadienes are butadiene, isoprene, 2.3-dimethylbutadiene and 2-chlorobutadiene. Examples for other polymerizable compounds capable of forming copolymerizates with butadienes are styrene and acrylic acid nitrile, fumaric acid ester and the like.

The following examples illustrate the present invention without, however, restricting it thereto the parts being by weight:

Example 1

25 parts of acrylic acid nitrile and 75 parts of butadiene are polymerized at 20° for 6 days in the presence of 200 parts of a 10% sodium oleate solution and with the addition of 0.4 part of benzoyl peroxide as catalyst. The yield of polymerizate amounts to about 16%.

When working under the same conditions while using 0.1 part of potassium ferriarabonate as catalyst the yield amounts to 88%. The addition of 0.12 part of ferripyrogallate effects a further increase of the yield to 100%, a polymerizate of excellent properties being thus obtained.

Example 2

When treating 25 parts of styrene and 75 parts of butadiene in 200 parts of a 10% sodium oleate solution in the presence of oxygen for 5 1/2 days at 21°, no polymerization takes place. When adding, however, 0.01 part of haemin and working under the same conditions a yield of about 79% is obtained.

Example 3

100 parts of 2-chlorobutadiene in 100 parts of a 2% aqueous sodium oleate solution are polymerized at 20° for 3 1/2 days in the presence of 0.7 part of ammonium persulfate, 0.5 part of tetramethylthiuram disulfide and 0.3 part of sulfur. The yield of polymerizate amounts to 52%.

When working as described above and adding 0.08 part of potassium ferriarabonate the yield may be increased to 91%.

Example 4

25 parts of acrylic acid nitrile and 75 parts of butadiene are polymerized at 30° for 18 hours in the presence of 200 parts of a 5% sodium oleate solution with the addition of 0.2 part of ammonium persulfate. The yield of polymerizate amounts to about 7%. When working under the same conditions while using 0.01 part of iron phthalocyanine sulfonic acid the yield amounts to 79%.

Example 5

25 parts of acrylic acid nitrile and 75 parts of butadiene are polymerized at 20° for 41 hours in the presence of 170 parts of a 3.5% solution of sodium isobutyl naphthalene sulfonate with the addition of 0.2 part of a normal sodium lye. The yield of polymerizate amounts to about 28%. When working under the same conditions while using 0.01 part of iron phthalocyanine sulfonic acid the yield amounts to 64%.

Example 6

25 parts of acrylic acid nitrile and 75 parts of butadiene are polymerized at 20° for 30 hours in the presence of 200 parts of a 5% sodium oleate solution with the addition of 0.2 part of ammonium persulfate. The yield of polymerizate amounts to about 7%. When working under the same conditions while using 0.1 part of cobalt phthalocyanine sulfonic acid (obtained from the potassium salt of 5-chloro-4-sulfophthalic acid) the yield amounts to 30%.

Example 7

When replacing in the preceding example 0.1 part of cobalt phthalocyanine sulfonic acid by 0.01 part of tin phthalocyanine sulfonic acid and working under the same conditions a yield of polymerizate of 68% is obtained.

Example 8

25 parts of acrylic acid nitrile and 75 parts of butadiene are polymerized at 20° for 30 hours in the presence of 200 parts of a 5% sodium oleate solution with the addition of 0.2 part of ammonium persulfate and 0.2 part of the disodium salt of nitrilo-triacetic acid. The yield of polymerizate amounts to about 5%. With the addition of 0.01 or 0.05 part of copper phthalocyanine sulfonic acid, however, the yield is increased to 56% or 75% relatively.

Example 9

25 parts of acrylic acid nitrile and 75 parts of butadiene are polymerized at 20° for 30 hours in the presence of 200 parts of a 10% solution of the water soluble condensation product obtained from oleyl alcohol and ethylene oxide, and with the addition of 2 parts of glacial acetic acid, 0.2 part of ammonium persulfate and 0.2 part of the disodium salt of nitrilo-triacetic acid. The polymerizate is obtained in a yield of about 8%. When working under the same conditions, however, with the addition of 0.05 part of copper phthalocyanine sulfonic acid, the yield is increased to 40 or 70% respectively. A similar effect is achieved by working in the presence of an iron phthalocyanine sulfonic acid.

We claim:

1. In the process of polymerizing in aqueous emulsion in the presence of emulsifying agents, polymerizable substances selected from the group consisting of butadienes-1.3 and mixtures of butadienes-1.3 with other polymerizable compounds capable of forming copolymerizates with butadienes, the step which comprises working in the additional presence of water-soluble phthalocyanines containing in complex combination such heavy metals as are capable of existing in different stages of oxidation, the said complex compounds being stable in an acid as well as in an alkaline medium.

2. The process as claimed in claim 1 wherein an iron phthalocyanine sulfonic acid is employed.

WALTER GUMLICH.
INGOFROH DENNSTEDT.